United States Patent
Ji et al.

(10) Patent No.: US 7,711,097 B2
(45) Date of Patent: May 4, 2010

(54) PAY-PER-CONNECTION SCHEME FOR WIRELESS ACCESS TO INTERNET

(75) Inventors: Lusheng Ji, Silver Spring, MD (US); Yannis Labrou, Baltimore, MD (US); Jonathan Russell Agre, Brinklow, MD (US)

(73) Assignee: Fujitsu Limited, Kawasaki (JP)

( * ) Notice: Subject to any disclaimer, the term of this patent is extended or adjusted under 35 U.S.C. 154(b) by 1151 days.

(21) Appl. No.: 10/875,207

(22) Filed: Jun. 25, 2004

(65) Prior Publication Data

US 2005/0043999 A1   Feb. 24, 2005

Related U.S. Application Data (60) Provisional application No. 60/485,382, filed on Jul. 9, 2003.

(51) Int. Cl.
   *H04M 15/00* (2006.01)
(52) U.S. Cl. .............. 379/114.2; 379/127.01
(58) Field of Classification Search ..............
   379/114.01–114.28, 127.01–127.06; 455/406–408
   See application file for complete search history.

(56) References Cited

U.S. PATENT DOCUMENTS

| | | | |
|---|---|---|---|
| 6,240,091 B1 * | 5/2001 | Ginzboorg et al. | 370/401 |
| 6,243,450 B1 * | 6/2001 | Jansen et al. | 379/144.01 |
| 6,584,097 B1 * | 6/2003 | Malik | 370/352 |
| 6,965,667 B2 * | 11/2005 | Trabandt et al. | 379/114.2 |
| 7,013,127 B2 * | 3/2006 | Wills et al. | 455/406 |
| 7,024,690 B1 * | 4/2006 | Young et al. | 726/5 |
| 7,065,339 B2 * | 6/2006 | Vallinen et al. | 455/406 |
| 7,171,686 B1 * | 1/2007 | Jansen et al. | 726/17 |
| 7,245,901 B2 * | 7/2007 | McGregor et al. | 455/406 |
| 2001/0054019 A1 * | 12/2001 | de Fabrega | 705/35 |
| 2002/0026426 A1 * | 2/2002 | Bennett | 705/64 |
| 2002/0161676 A1 * | 10/2002 | Vadlamani | 705/30 |
| 2002/0165823 A1 | 11/2002 | Iwamura | 705/41 |
| 2004/0077332 A1 * | 4/2004 | Ephraim et al. | 455/405 |
| 2005/0235052 A1 * | 10/2005 | Koskinen et al. | 709/223 |

FOREIGN PATENT DOCUMENTS

| | | |
|---|---|---|
| CN | 1151647 | 6/1997 |
| JP | 9-73337 | 3/1997 |
| JP | 2002-315058 | 10/2002 |
| WO | WO 02/052834 | 7/2002 |

OTHER PUBLICATIONS

Chinese Office Action issued Oct. 13, 2006 in corresponding Chinese Patent Application No. 2004100697197.

(Continued)

*Primary Examiner*—William J Deane
(74) *Attorney, Agent, or Firm*—Staas & Halsey LLP (57) ABSTRACT

A pay-per-connection system is coupled to a network service provider and to a client computer. The pay-per-connection system receives payment and a passcode from a user, determines duration of use based on the payment, and provides access by the client computer to the network service provider based on the payment and the passcode without advance sign-up by the user with the network service provider.

33 Claims, 3 Drawing Sheets

OTHER PUBLICATIONS

Boingo Wireless—Sign Up Page, https://signup.boingo.com/selfcare/reg/start.do, printed Jun. 25, 2004.
"Wireless Hotspots Heat Up", Network Computing, dated May 15, 2003, pp. 35-40.
"Common Goals, Unique Strengths", Network Computing, dated May 15, 2003, pp. 43-55.
Chinese Patent Office Action, mailed Jun. 20, 2008 and issued in corresponding Chinese Patent Application No. 2004100697197 (3 pages), includes partial English translation (1 pg).
Japanese Office Action mailed Jun. 16, 2009 in corresponding Japanese Office Action 2004-201590 (3 pages) (3 pages English translation).
Japanese Office Action mailed Sep. 1, 2009 in corresponding Japanese Office Action 2004-201590 (3 pages) (3 pages English translation).
Japanese Office Action mailed Nov. 6, 2009 and issued in corresponding Japanese Patent Application No. 2004-201590 (3 pages) (5 English Translation).

* cited by examiner

PAY-PER-CONNECTION SCHEME FOR WIRELESS ACCESS TO INTERNET

CROSS-REFERENCE TO RELATED APPLICATIONS

This application is related to, and claims the benefit of priority of, U.S. Provisional Application Ser. No. 60/485,382, filed Jul. 9, 2003, the contents of which are incorporated herein by reference.

BACKGROUND OF THE INVENTION

1. Field of the Invention

The present invention is directed to providing wireless access to networks, and, more particularly, to providing wireless access to networks on a pay-per-use basis without requiring a subscription service.

2. Description of the Related Art

One of the common characteristics of today's hotspot service business is that the service providers ambitiously aim at large scale deployments. There are two basic models for such WISP (Wireless Internet Service Provider) operators. In one of the models, an a wireless carrier deploys its own network and charges customers for using it by having customers subscribe to their network service. In the other of the models, WISPs become partners with a wide-area network provider that will handle the billing and customers subscribe with the provider for the network service. In the former model, the subscribers can only use the one (or a small number of affiliated) WISP but they still have the overhead of signing up and being billed for this particular site. In the latter model, the wide area network provider will offer integrated access to all partnered networks and consolidated billing, but tends to charge more for this service (both the WISP and the provider/aggregator are getting paid) in return for offering this larger coverage.

Wide-area WISP providers promise customers access to many hotspots, large continuous coverage areas, and roaming services. Consequently with such a deployment plan in which a customer is able to get access service at any of the deployment points of the same provider, the service follows a centralized subscription model. After signing up, customers can be AAA-ed (authenticated, authorized, and accounted) by the wide area network provider and obtain access service at any of the hotspot locations belonging to the same provider network.

However, such a business model has some inherent problems.

Firstly, the cost of setting up the business is high due to its large scale of operation. For this subscription model to be successful, the business needs to attract enough customers. Thus, to justify the monthly charges and provide more value to attract more customers, the service provider needs to deploy more hotspots or attract more service providing partners. Although in general deploying a single Wi-Fi access point (AP) is cheap, with large number of AP's to deploy, the total cost becomes high. Atop of these costs, the ISP connection cost for these AP's, client premise installation issues, and maintenances all contribute to hotspot business costs.

Secondly, since the Wi-Fi spectrum is part of the ISM frequency band and is unlicensed, any company can deploy its own hotspot services. Thus in busy districts there are likely multiple service providers crowding into the same areas and providing overlapping hotspot services. However, the bandwidth available for Wi-Fi is limited and competition between providers will worsen channel congestion situations.

Thirdly, roaming has been regarded as one of the "must-have" features for hotspot services. This is a tradition from the cellular industry that the hotspot service providers are also trying to follow. For cellular users, a roaming feature is essential as a user not only makes outgoing calls, but also expects incoming calls. For routing incoming calls to roaming users, the cellular phone industry has developed large subscriber databases to track users across service areas and service operators so that incoming calls for the users can be forwarded. However for a typical hotspot user, the usage pattern is very different. Almost all Internet applications follow the "client polling" type of access model where usually it is the mobile user who initiates any TCP/IP (Transport Control Protocol/Internetwork Protocol) connections and the user does not typically expect incoming IP connections. If only this type of usage pattern is considered, there can be much lighter-weight system solutions and the whole AAA architecture as developed by many hotspot service providers is not necessary.

Fourthly, seamless handoff is another feature provided by cellular phone system for mobile users. When users travel across the boundaries between cells, phone calls are not disconnected. Voice-over-IP (VoIP) and video streaming applications have been promoted as two of the driving applications for hotspots because of the potential cost reduction and higher bandwidth compared to carrying traffic for these types of traffic over cellular telephony links. In addition, these two types of applications are really the major reason for providing seamless handoff. However, several issues seriously will limit the popularity and use of these two types of applications.

Seamless handoff is a much more difficult technical problem for hotspot services due to two facts: a) Wi-Fi cells are much smaller so that handoff occurs much more frequently than in cellular cells, and b) all current Wi-Fi client devices are single transceiver devices so it is not possible for the device to negotiate a smooth handoff. This would require the device to contact the new access point while maintaining communication with the old access point, to accomplish a "make-before-break" type of handoff as in cellular systems. With only one transceiver, Wi-Fi handoff is interruptive to the on-going communication and frequent handoff affects real-time traffic quality. Recent work on fast roaming and handoff will reduce the interruption time, but will not eliminate it. Another issue is that the Internet infrastructure is not yet in place. For an IP network to be able to perform handoff within large areas, the IP mobility management infrastructure, such as the deployment of Mobile IP needs to be in place. In addition, VoIP and streaming video applications typically require special hardware such as gateways which are not widely available. Lastly, the users are not familiar with the technologies and the requirement for user education is another reason preventing the growth of the use of such applications.

Excluding peer-to-peer traffic, currently interactions with the world wide web are the most dominant traffic on the Internet. Other major application traffic types belong to Internet gaming and other traditional applications. VoIP and streaming video traffic currently only count for less than 2% of the total Internet backbone traffic. Hence in the short term, seamless handoff is not as important as many hotspot service providers claim.

In summary, the current hotspot business model is too ambitious and heavy weight. It resembles the cellular operator business model and disregards the special characteristics of Wi-Fi technology. The Wi-Fi technology has small cells and uses unlicensed radio bands which result in opposite conditions from the cellular phone technologies. There are also many differences in usage patterns between IP traffic that would be carried over a hotspot and voice traffic carried over the cellular network, for example.

Also in the current hotspot business model, a large service infrastructure is provided and complex accounting for usage is necessary. In addition, this model relies on a large subscriber base to support such an infrastructure.

SUMMARY OF THE INVENTION

The present invention solves the above-mentioned problems.

An aspect of the present invention provides pay-per-connection access to a communications network and in particular to a wireless communications network.

Another aspect of the present invention enables a wireless internet service provider to provide wireless access without advance sign-up to the wireless service.

A further aspect of the present invention includes a "pay-as-you-go" hotspot service directed at small and independent service providers, enabling these small and independent service providers to provide basic connectivity service.

Yet another aspect of the present invention is to introduce a third model for WISP operators, a pay-per-use model, which does not require advanced sign-up, allowing a WISP to offer a lower-cost, site-specific service to a large customer base.

The above aspects can be attained by a "pay-as-you-go" type of Wi-Fi hotspot access services in a model similar to public pay phones, parking meters or vending machines.

The present invention includes a Pay-Per-Connection (PPC) device for such "pay-as-you-go" service. Using the PPC system of the present invention, a small business, a store owner, a restaurant owner, or even a home owner, can deploy their own hotspot service and become a hotspot service provider. The only things the hotspot service provider needs to do is to have a broadband connection to the Internet, purchase a PPC system, and place the PPC device somewhere on their premise. When a customer needs to use the Internet, he would walk up to the PPC system, and deposit some cash into the device (or pay using another payment method, e.g. credit card, special purpose magnetic strip card, smart card, or wireless payment systems). The wireless connection then becomes available for this customer for an allocation of use (e.g., time duration or amount of data transfer) that is determined by the amount of money the customer deposits and the rate for the connection as set by the hotspot service provider.

The present invention includes a pay-per-connection system coupled to a network service provider and to a client computer. The pay-per-connection system receives payment and a passcode from a user, determines the allocation of use based on the payment, and provides access to the client computer to the network service provider based on the payment and the passcode.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Throughout, PPC refers to pay-per-connection of the present invention.

PPC System Overview

Customer Identification

Before any system component of the present invention is described, a new method to identify a paying customer and to only provide services to the paying customers is introduced. This is necessary since, unlike a public payphone or Ethernet jack in which one service port only serves one paying customer, when a wireless interface on an access point is enabled to serve one customer, all customers within the communication range of the access point can potentially establish physical layer connections.

In the PPC system, each customer (client) is identified by the physical address (MAC address) of the LAN or WLAN interface on their computer. More sophisticated systems often require security certificates for customer identification. However in the PPC system, where the focus is on convenience not security, only the physical address of the LAN or WLAN interface is used. The binding between a particular customer and a payment is a small code word known as the "passcode". The passcode is selected by the customer and entered into the PPC system at the time of payment depositing. The PPC system thus binds a particular amount of connection usage information with the passcode. Later on when the customer requests to use the connection, the customer is prompted to enter their passcode. After entry of the passcode, the PPC system is able to further bind the customer's MAC address to her passcode, and look up the connection usage for this particular passcode, which is already stored in the PPC system.

There are many possible ways to provide connectivity service only to paid customers and block unpaid connections using different layers of an IP protocol stack. For example, a link layer blocking may be performed by applying MAC address filtering or denial of 802.11 association. However, these solutions typically involve changing the internal state of the access points. This may be inefficient as most of the Wi-Fi access point implementations are not designed to accept real-time, on-the-fly modification to their access control lists. In addition, such link layer mechanisms may require additional functions being supported by client wireless LAN devices and client computers, hence require additional software installation. Such a requirement is, therefore, unfavorable.

Another possible method to limit the unwanted connections is to apply link layer encryption by only giving the encryption key to paid customers. The basic static Wired Equivalent Privacy (WEP) scheme of the IEEE 802.11 standard will not work as firstly it is not a convenient solution as the paying customers need to configure their devices to install the WEP key and secondly since WEP protection is not particularly strong unpaid customers may break the encryption key and obtain service. Hence if link layer encryption is used as the method to enforce service access, only a per-user encryption between paid customers and the PPC system Access Points would be truly effective for blocking unwanted connections. Newer systems do support such per-user encryption mechanisms. The most popular example is the emerging new WiFi Protected Access (WPA) mechanism, that uses the "IEEE 802.1x" authentication process. Under IEEE 802.1x authentication, a client exchanges its certificate with a prospective Access Point, which in turn contacts an authentication server to verify the authenticity of the certificate. After certificate verification, the Access Point will generate a WEP key specifically for this client and delivers the per-session key to the client. The main problems with basing the PPC system design on WPA are that not all legacy WLAN devices support WPA security and there is the need for certificates.

Again, link layer access protection is not employed in the PPC system for clients without IEEE 802.1x support because of the additional software requirements and configuration efforts required by clients. For clients configured with WPA security, the PPC system will support the IEEE 802.1x protocol so that the client's WLAN interface can be automatically configured. However, the client certificate verification is not necessary during this process hence any certificate is accepted without inspection.

In summary, from both an implementation and compatibility aspects, the most appropriate place to block unwanted connections is to use a firewall "filter by MAC address" function that is available in many operating systems. In the PPC system, a list of MAC addresses known as the allowable MAC address list is maintained, which contains the MAC addresses of the users whose traffic is allowed to pass, in other word, those of the paying customers. Using this approach, unpaid customers may get an initial link layer connection, but their traffic will not pass through the firewall to reach the Internet. Hence they are not really enjoying any Internet connectivity.

PPC Connection

In the PPC system of the present invention, the connection of the user to a network (such as the Internet) is identified using a user-chosen passcode and the firewall in a PPC system (which is explained herein below) is used to provide access to the Internet only to those customers with valid passcodes and to block access by all others. When the customer begins to use the connection to access the Internet, connection usage is measured and periodically deducted from the paid for allocation. When all the allocation is used up, the user is blocked from further access until additional funds are provided.

The PPC system of the present invention includes a method which allows connectivity service to paying (or otherwise authorized) customers (or system clients) while restricting non-paying (or otherwise unauthorized) customers from obtaining such connectivity service.

Figure 1:
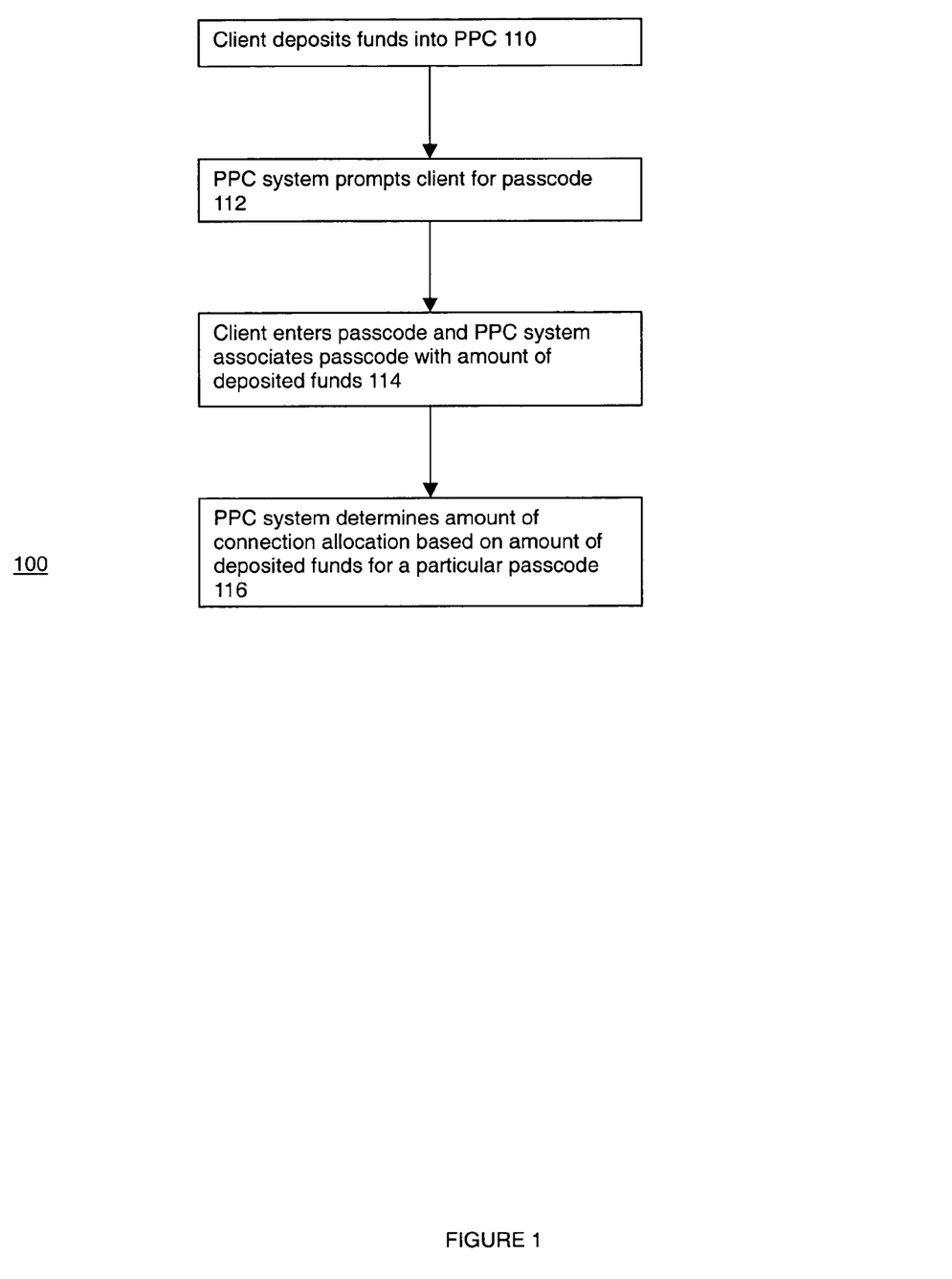
FIG. 1 shows a flowchart of the present invention.

A two-step process is employed to allow access by customers. First the client deposits funds into the payment device and selects a passcode. Second, when the client attempts to connect their computing device to the network, the client must provide the passcode. The first step is shown in FIG. 1 where a flowchart 100 of the method of a client depositing funds to the PPC system of the present invention is given. The PPC system (300) of the present invention is fully disclosed herein below, with reference to FIG. 3.

The amount of network use allowed is called the connection allocation. The most straight forward way of allocating and pricing a connection service is to use the duration of the connection. Using this pricing method, the duration is determined by calculating the number of minutes or seconds that can be purchased by the user's funds. Under this scheme, the usage allocation of the connection is based on time. Other pricing schemes may also be supported by the PPC system, in which case the time allocation for each passcode is substituted by a corresponding allocation counter recording the remaining connection usage of the user. For example, if the system charges based on the amount of data flow, there is a counter of how many more bytes of traffic this client may sent and/or received. Initially it is set to the number of bytes the user's deposit may purchase. This counter is deducted as the client data traffic passes by the PPC system. Once this counter reaches zero, the connection is terminated. In subsequent text the term "connection usage allocation" is often used to generalize the same concept under different charging scheme.

Referring now to FIG. 1, in the PPC system of the present invention, immediately after a customer successfully deposits 110 funds, the PPC system will prompt 112 the customer for a passcode. The customer enters 114 whatever passcode she wishes and the PPC system associates 116 this passcode with the amount of funds the customer just deposited. Hence the passcode becomes a token for a connection usage allocation, which is determined by the amount of the funds this customer deposits and the rate of connection. The same process is also used for a user to add more funds to extend her connection usage allocation. Only this time the passcode needs to be the same as the one for her existing connection.

That is, the PPC system of the present invention provides access to a wireless network by a user, without advance sign-up by the user to the PPC system, or by the user to the wireless network or service provider.

Figure 2:
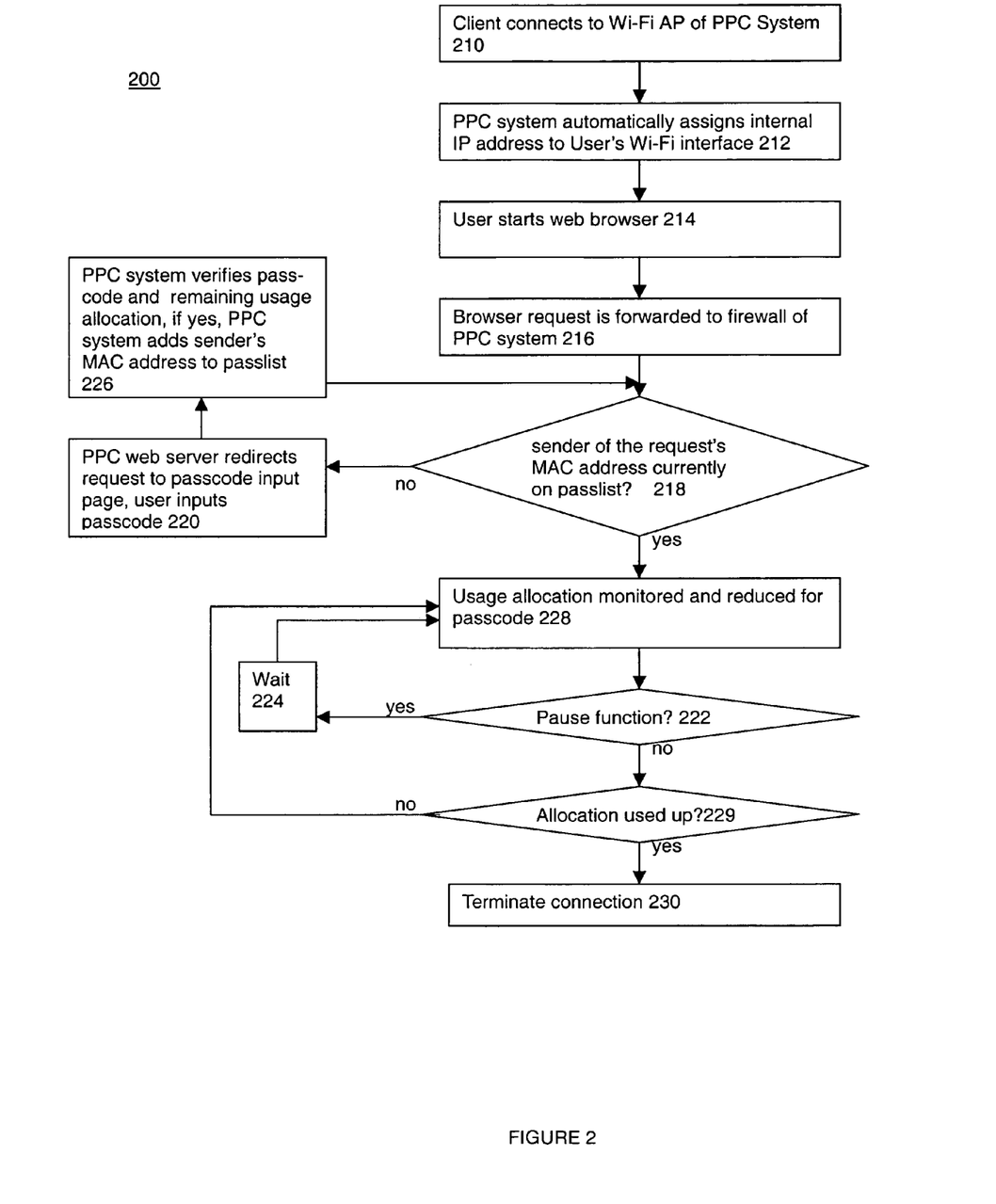
FIG. 2 shows a flowchart of establishing connection in the present invention.
Figure 3:
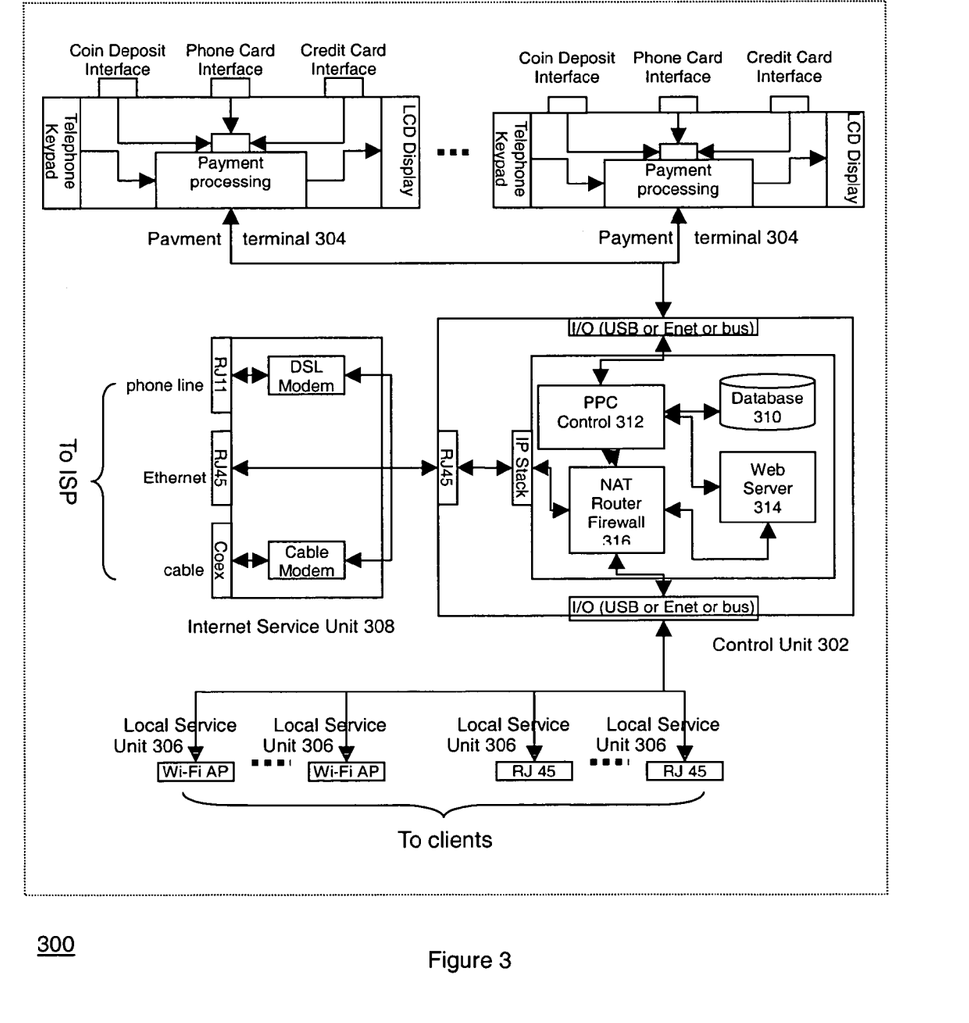
FIG. 3 shows a PPC system architecture of the present invention.

FIG. 2 shows a flowchart 200 of the second step where a client that has a connection use allocation is establishing a connection using the PPC system 300 of the present invention. More particularly, in the PPC system of the present invention, when the client wants to use the connection, they would wirelessly connect 210 the Wi-Fi interface of their computing device to one of the Wi-Fi access points of the PPC system and the PPC system would accept the WLAN connection and assign 212 an internal IP address to the customer's Wi-Fi interface automatically (using an auto configuration protocol such as DHCP). Then when the client wishes to connect to the Internet, they would start 214 their web browser. The browser request, regardless of which Internet web site the browser actually points to, is forwarded 216 to the control unit of the PPC system. If the sender (identified by the MAC address of the customer's Wi-Fi card) of the request is not currently in the "pass list" of the PPC system 218, the request is redirected to a user passcode input page locally stored on the PPC system. The client will see this page and would be requested to input 220 their passcode. So, the client enters the passcode, it is received by the PPC system and after verifying that there is a record for this passcode and there is still a remaining usage allocation for this passcode, the PPC system begins to provide connection service to the client by adding 226 the client's MAC address to the passlist of the firewall to allow its data to pass through.

As a client is being served with a connection, the PPC system periodically reduces 228 the connection usage allocation. A pause function for the PPC is implemented that will allow a client to choose to suspend the use of the connection for a period of time without incurring allocation charges. If the pause function is selected 222, through a web page interface provided by the PPC system to every authorized client, the PPC system then waits 224 until the pause function is de-selected. During the waiting period 224, the usage allocation of the connection, if connection time, is not deducted, and no traffic of this client is allowed to pass through the PPC system. After the connection usage allocation is used up 229, the PPC system of the present invention terminates the connection by removing 230 the user's MAC address from its firewall's passlist, along with the passcode and any allocation information related to the passcode.

If a client wants to pay for additional connection usage allocation before her current connection allocation runs out, she only needs to input the same passcode after depositing additional funds to the same PPC system as described by the flowchart 100 in FIG. 1. When the PPC system receives a passcode which is already in its passlist, the PPC system will confirm with the user if she indeed wants to add more allocation to an already authorized connection, and if not the user will be asked to select a different passcode. This step is to prevent the situation when a new user happens to select a passcode which belongs to an already authorized user. Otherwise the funds deposited by the new user will be applied to this already authorized user who has the same passcode. After the user confirms that the new payment is indeed for increasing allocation for an already authorized connection, the remaining connection usage allocation stored in the record on the PPC system for this passcode is then updated to reflect the additional allocation 116 resulting from the user's new deposit.

In one embodiment of the present invention, a refund function is included. The refund function will return the unused portion of the payment to the client. In the refund function, to receive a refund, a connected client selects a termination function, also through a web page interface provided by the PPC system, to indicate the intent to end the connection to the network service provider. Selection of the termination function will cause the pay-per-connection (PPC) system of the present invention to prompt the client to further indicate if the client desires to obtain a refund. If the client indicates that a refund is desired, the PPC system stores this indication. The client must then disconnect from the PPC system (including the network service provider) and then physically go to the payment station. Upon entering the passcode into the payment station, the client is given the option to select a refund. If selected, the payment system will return the remaining funds to the client. By requiring that a client be connected to indicate the intent to get a refund, random guessing of passcodes and requesting refunds is effectively prevented.

Passcodes as described above are intended for short term use only. Thus, each passcode record will only remain in the PPC system for certain period of time. There is an expiration time associated with each passcode. After that period, the passcode is expired and all paid connection time is lost. In other words, unused connection time is gone if it is not used within this expiration period of the passcode. The "pause" function described above is also supported only within the valid period of the passcode.

To avoid duplicated passcodes by different customers, although not likely to happen, the PPC system prompts a user to determine if she indeed wants to add time for an existing passcode if the entered passcode matches with an existing record. If no, then the PPC system prompts the customer to select a new passcode. Unauthorized use of duplicate passcodes or guessing of passcodes will not be successful due to the binding of the MAC address to the passcode. A user with a MAC that does not match the existing MAC associated with the passcode will be blocked from network access.

In an embodiment of the invention, a longer term passcode may also be incorporated into the PPC system. In this case the passcode is equivalent to an account number. Customer may store this passcode on their computer in the form of a cookie and pay for connection time for this passcode whenever they want. Periodic (monthly, weekly, yearly) service plans may also be offered through these long term passcodes. Since the PPC system does not provide link layer data security, the transmission of such a cookie from customer device to PPC system must be over encrypted application layer connections such as the SSL.

To distinguish between the long and short term passcodes, the long term and short term passcodes have different formats in an embodiment of the invention. Short term passcodes should be easy to remember for a short period of time by customers and easy to input. The passcode space is also large enough so that different customers are not likely to select the same passcode within the passcode effective period. Except for large establishments, a 4-digit numerical code is usually enough. On the other hand, long term passcode have a much longer format as they are not expected to be remembered and will need to be keyed in every time by the clients.

The PPC system is intended for deployment in public areas where the expectation for privacy is low, unlike in typical home or office environments. In addition, regardless of what strong WLAN security is employed, only the wireless transmission of data is protected. Since, the service providers may always intercept data without WLAN security protection from the other side (broadband connection side) of their PPC systems, users with high security requirements must always use addition security mechanisms such as VPN (Virtual Private Network) and/or Secure Socket Layer (SSL) to access sensitive data over the PPC.

Nonetheless certain additional measures may be taken by the PPC system to reduce the security risk if a client has the concern regarding the chance that other clients of the PPC system may break into her system. Such risk exists in any public hotspot system. However, the PPC system is able to prevent certain of these attacks by not allowing any connections between other clients of the same PPC system. In addition the PPC system needs to ensure that no client is able to inject packets and pretend its packets are from the broadband side of the PPC system. Combined with WPA support, such attacks from other clients can be prevented.

PPC System Components

In general, the PPC system of the present invention is a standalone system that can be produced using existing technology components and software in which the above-disclosed methods 100 and 200 of the present invention are implemented. The off-the-shelf hardware components of one embodiment of the invention include: an electromechanical payment device that accepts bills, coins or credit cards (such as used in vending machines) and that can be interfaced to a personal computer, a computer controller/interface board for such a device for insertion in a computer, a personal computer for the interface card, for control, for a firewall and web server functions and for connection to the Internet. A WiFi access point (this could also be hosted in the personal computer) for wireless service is also be connected with the computer. A highspeed Internet connection to an ISP is also needed.

The architecture of the PPC system 300 of the present invention is shown in FIG. 3. The PPC system 300 of the present invention provides the user with a wireless connection to the Internet for a specific allocation of use, which can be extended by the user, without advance sign-up with an ISP.

The PPC system 300 includes a Control Unit (CU) 302, at least one Payment Terminal (PT) 304, at least one Internet Service Unit (ISU) 308 and at least one Local Service Unit (LSU) 306. The PTs 304 handle payment and client interaction, the LSU 306 provides local connection service, the ISU 308 provides the connection to the Internet and the CU 302 controls the PPC system 300. In its most compact form, the CU 302, PT 304, ISU 308 and LSU 306 may be included in a single package. Optionally, the PPC system 300 may include a multiple ISPInternet Service Unit (IIU) 308 that converts various types of broadband service provider's access interfaces to a standard IP interface to connect to the PPC system 300.

The LSUs 306 are typically standard Wi-Fi access points. The LSUs 306 may be enabled all the time or only enabled when there is at least one active passcode in the PPC system 300. The LSUs 306 provide open Wi-Fi access for clients (or client computers) except for those with WPA supports, to which the WPA authentication procedure is followed, but with no real verification of client certificates. Ethernet ports are also included as LSUs 306 to provide a wired connection to the PPC system. The LSUs 306 are coupled to the CU 302 through a USB, Ethernet or data bus.

The ISU 308 provides the uplink/downlink from the PPC system 300 to the ISP. The ISU 308 includes the Internet connection such as a DSL Modem, a cable modem or a wireless modem, for connection to the ISP through phone line (RJ11), Coax (cable) or 3-g cellular systems, respectively. The ISU 308 may be incorporated into the PPC system 300 and use an Ethernet link interface on the CU 302 system 300. The ISU 308 is typically coupled to the CU 302 through an Ethernet RJ45 interface.

The PT 304 includes the interfaces for customers to deposit funds (such as a coin deposit interface, a phone card interface, and a credit card interface), a simple display (LCD or even LED), and a small keypad or touchable screen for input of the passcodes. The function of the PT 304 is to interact with customers and accept customer funds.

The operation flow of a PT 304 is analogous to the standard operation flow of a vending machine a user deposits funds, then the machine queries for user purchase selection and user enters the purchase selection. The machine then checks for the availability of the selected merchandise. If such an item has been sold out, the machine would prompt the user to make a different selection. Finally, the machine disposes the merchandise.

In the operation flow of the PT 304, the client deposits funds, then the PT 304 executes its payment processing through which the PT 304 queries the client for a passcode and the client enters his/her passcode. The payment and passcode are passed to the CU 302 in a message in a format such as {passcode, money amount}. The CU responds with the connection allocation that is displayed to the client, unless the passcode already exists. If the passcode exists in its database 310 further interaction with the client is needed. If so, the PT 304 confirms with the client that they are paying for an additional connection allocation for the passcode. The PT 304 is coupled to the CU 302 through a USB, Ethernet or parallel bus or serial bus.

The CU 302 is the core of the PPC system 300. The CU 302 includes a PPC Control module 312, a database 310 to store all passcodes in a passlist, a web server 314 interacting with client computers (or clients), and a Firewall module 316 to provide traffic filtering based on the passlist and network address translation. Other standard network service components such as DHCP server and SSH server are not shown in FIG. 3 as they are standard Internet components.

The PPC Control module 312 is the control center for the firewall 316. Every time the PPC Control module 312 receives a payment message from the PTs 304, the PPC Control module 312 computes the resulting connection allocation, compiles the results into its database 310 to update the corresponding passcode record in the passlist. In addition, if a payment message is for a passcode already in use, other than updating the database record the control module 312 updates the allocation for this passcode as well. The control module 312 also interacts with the Firewall module 316 to monitor the connection use by all clients. When an allocation for a passcode is used up, the control module 312 instructs the Firewall 316 to block traffic for the client associated with the passcode.

The Firewall 316 will examine all packets coming into the PPC to/from the LSUs or to/from the ISU. The Firewall 316 will filter the packets using an allowable MAC address list, where the allowable MAC addresses are determined by the web server 314 and the control unit 312. By default, the Firewall 316 redirects traffic from the LSUs 306 from all unknown clients (MAC address) to the web server 314 running on the PPC system 300. The web server 314 in turn queries the client for the passcode input. After getting the user passcode input, the web server 314 sends the passcode and the associated MAC address to the control module 312 in the form of a message {passcode, MAC address}. The control module 312 then compares the client input passcode with its passlist records to see if the passcode has a positive allocation. Also, the control module will check if there is a MAC address associated with this passcode record. If there is none, the MAC address is stored with the record. If there is a different MAC address associated with the record, then the client request is rejected and the web server 316 will inform the client. If there is a positive allocation and a valid MAC address, the control module 312 instructs the firewall 316 to let traffic from this client pass through by sending the firewall module 316 the MAC address of the client. The firewall module 316 puts this MAC address in its allowable MAC address list. The control module 312 also starts to monitor and update the usage allocation stored in the database 310 for this passcode. All traffic from the ISU 308 side is blocked unless the packets are destined for one of the MAC addresses in the firewall pass list.

The database 310 is used to store the client information. It is organized by records where the record contains the passcode, the remaining allocation and the MAC address of the client device. It is indexable by the passcode.

The PPC system 300 of the present invention executes the operations discussed herein above with reference to FIGS. 1 and 2.

Summary

A Pay-per-connection (PPC) service system 300 is described as well as how such a PPC system 300 can be used to generate profits for almost any business that would like to provide a Wi-Fi access service to the Internet, such as through a Wi-Fi (e.g., IEEE 802.11) Wireless Local Area Network (WLAN) without requiring a subscription to the network service, are disclosed herein above.

There are several potential methods of providing such a PPC service. In an embodiment of the invention, an Internetwork Protocol (IP)-based approach uses the capabilities of a network firewall to control access into the network while allowing users to connect with standard network equipment and standard WLAN software. This is coupled with a simple payment and control model that is straight-forward to implement and avoids many issues that complicate larger-scale hotspots such as roaming, handoff, strong security and billing/accounting.

An advantage of such a PPC system of the present invention is its simplicity. It is very simple for a business to offer a hotspot service. The PPC system of the present invention is easy to set up and operate. Individual owners can quickly and easily deploy their own access service and generate income from it. In its simplest form, the whole PPC system can be made into a single, low-cost package. The service provider only needs to plug it into an ISP interface and the PPC system is ready for generating cash flow. There is no need for paying the additional cost of a subscriber system to backup the access service. It is ideal for small business owners, regardless of their understanding level of the technology, to take advantage of the Wi-Fi technology.

It is also a simple system in terms of user experience. A user only needs to be at a payment terminal, deposit some funds, and enter any passcode. When initiating a connection, the browser on their computing device is directed to the passcode input web page for the user to input their passcode. There is no need for complex setup on the user side and there is no need for additional software installation. The experience is essentially the same as using a public payphone or vending machine. Little user education is required.

In addition, the PPC system protects user privacy because a user may remain totally anonymous while using the service. Unlike other systems in which a user must identify herself to the service provider to receive service, the PPC system receives no user identity information if the user pays cash.

One issue for a pay-as-you-go connection is that due to the nature of wireless communication the physical layer connection becomes available for all users within the radio signal's reach, regardless of who is the paying customer. Hence, the present invention includes a method provided by the PPC system to bind the paying customer and an authorized connection and to prevent others from accessing the service.

Another issue is that currently most residential broadband service providers require a "no reselling" agreement from its subscribers. Thus under such an agreement, residential broadband subscribers are not allowed to profit from providing access services using the broadband connection. Hence she can not provide PPC services. One way to solve this problem is to work with the broadband service providers to establish a different type of agreement so that deploying such PPC systems becomes mutually profitable for both the PPC provider and broadband provider.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A pay-per-connection system coupled to a network service provider and to a client computer provided by a user as a user provided client computer and comprising:
   a local payment terminal physically local to the pay-per-connection system and maintaining anonymity of the user by receiving payment and a passcode not identifying user information as a no user identifying passcode from the user at the local payment terminal, and transmitting a payment message and the no user identifying passcode,
   a local service unit in communication with the user provided client computer and transmitting and receiving information,
   an internet service unit in communication with the network service provider and transmitting and receiving information,
   a control unit including a database, coupled to the payment terminal, to the local service unit and to the internet service interface unit, said control unit
      receiving the payment message and the no user identifying passcode from the payment terminal,
      determining an allocation of usage of a network connection between the user provided client computer and the network service provider using the internet service unit based on the payment message,
      binding the no user identifying passcode with network connection usage allocation,
      storing a record including the no user identifying passcode and the network connection usage allocation in its database,
      enabling access for the user provided client computer to the network service provider through the internet service unit and the local service unit for the allocated amount of usage, upon the user provided client computer communicating the no user identifying passcode and identifying information of the user provided client computer to the control unit, and
      preventing unauthorized client computers from accessing the network service provider through the pay-per-connection system, according to a filtering of bound no user identifying passcodes and identifying information of client computers.

2. The pay-per-connection system as in claim 1, wherein the network connection between the user provided client computer and the local service unit is a wired or wireless connection which becomes available for the user provided client computer for the network connection usage allocation for an amount of connection time determined by amount of payment the user of the user provided client computer deposits into the payment terminal and a rate for network connection use set by the network service provider and other charges.

3. The pay-per-connection system as in claim 1, wherein the network connection usage allocation is determined by data allocation which is amount of data bytes that the user sends and receives via the pay-per-connection system, which is based on amount of payment the user deposits in the payment terminal and a rate for data volume set by the network service provider and other charges.

4. The pay-per-connection system as in claim 1, wherein the payment terminal accepts the payment in the form of at least one of cash, a phone card, or a credit card.

5. The pay-per-connection system as in claim 1, wherein the connection between the user provided client computer and the network service provider is terminated by the control unit upon exhaustion of the network connection usage allocation.

6. The pay-per-connection system as in claim 1, wherein duration of the network connection usage allocation may be increased upon receipt of additional payment from the user by the payment terminal.

7. The pay-per-connection system as in claim 1,
   wherein the control unit comprising a timer which determines remaining connection time for the network connection usage allocation between the user provided client computer and the network service provider,
   wherein when the remaining connection time reaches zero, the network connection is terminated, and when the network connection is paused by the user, the timer suspends counting, and when the network connection is resumed by the user, reduction of connection time for the network connection usage allocation continues by the timer.

8. The pay-per-connection system as in claim 1, wherein the control unit comprises a counter that determines remaining data transfer allocation that can be transferred to or from the user provided client computer and the network service provider, wherein when the remaining data transfer allocation reaches zero, the network connection usage allocation is terminated.

9. The pay-per-connection system as in claim 1,
wherein the identifying information of the user provided client computer is a MAC address transmitted to the service unit to request network connection service, and
wherein the service unit transmits the no user identifying passcode and the MAC address to the control unit, and the control unit determines whether to establish the network connection between the user provided client computer and the network service provider based upon if the no user identifying passcode matches with the no user identifying passcode included in any payment message received from the payment terminal and/or whether the MAC address matches a stored MAC address, and whether there is a remaining network connection usage allocation.

10. The pay-per-connect system as in claim 1, wherein the control unit stores a passlist of no user identifying passcodes for which the network connection is permitted and includes a firewall including a list of allowable MAC addresses which correspond to the passlist of no user identifying passcodes, and the control unit provides permission to establish the network connection between the user provided client computer and the network service provider through the firewall by placing the MAC address of the user provided client computer on the allowable list.

11. The pay-per-connection system as in claim 1, further comprising a web server interfacing to the user provided client computer to let the client computer supply the no user identifying passcode to the pay-per-connection system when a network connection is requested.

12. The pay-per-connection system as in claim 1, wherein the network connection between the user provided client computer and the local service unit is a wireless connection.

13. The pay-per-connection system as in claim 12, wherein the wireless connection is provided by a Wi-Fi access point.

14. A method of providing a pay-per-connection service by a business for establishing a network connection from a client computer provided by a user as a user provided client computer to a network service provider on a pay-per-connection basis, comprising:
providing a payment terminal physically local at the business, and maintaining anonymity of the user by receiving, at the payment terminal, from the user a passcode not identifying user information as a no user identifying passcode and a payment, and from the user provided client computer identifying information; and
connecting, by a pay-per-connection system physically local at the business, the user provided computer to the network service provider by:
determining a network connection usage allocation based on amount of the payment;
binding the no user identifying passcode with the network connection usage allocation; and
establishing, by the pay-per-connection system, the network connection between the user provided client computer and the network service provider for the network connection usage allocation bound to the no user identifying passcode, based on the network connection usage allocation, the no user identifying passcode, and the identifying information of the user provided client computer, without advance sign-up by the user with the network service provider.

15. The method of claim 14, further comprising preventing unauthorized client computers from accessing the network service provider through the pay-per-connection system, according to a filtering of bound no user identifying passcodes and identifying information of client computers.

16. The method as in claim 14, wherein the network connection is a wireless connection, said method further comprising:
determining availability of the wireless connection based upon if there is any remaining connection time for the network connection usage allocation for the wireless connection which becomes available for the user provided client computer by amount of money the user deposits into the payment terminal and a rate for network connection set by the network service provider.

17. The method as in claim 14, further comprising:
determining availability of the wireless connection based upon data allocation which is amount of data bytes that the user sends and receives via the pay-per-connection system, which is based on the amount of money the user deposits into the payment terminal and a rate for data allocation set by the network service provider.

18. The method as in claim 14, further comprising terminating by the pay-per-connection system the network connection upon exhaustion of the network connection usage allocation.

19. The method as in claim 18, wherein the termination of the network connection comprises deleting by the pay-per-connection system the no user identifying passcode and its associate network connection usage allocation from the pay-per-connection system.

20. The method as in claim 14, further comprising extending by the pay-per-connection system the network connection usage allocation by additional payment by the user.

21. The method as in claim 14, further comprising permitting the user to pause reduction of the network connection usage allocation by the pay-per-connection system during the network connection.

22. The method as in claim 14, wherein the receiving comprising receiving by the payment terminal the payment by at least one of cash, phone card, or credit card.

23. A computer-readable recording medium storing a program executable by a computer system including a payment terminal physically local to the computer system and causing the computer system to execute functions of establishing a network connection from a client computer provided by a user as a user provided client computer to a network service provider on a pay-per-connection basis, according to operations comprising:
maintaining anonymity of the user by receiving, at the payment terminal, from the user a passcode not identifying user information as a no user identifying passcode and a payment, and from the user provided client computer identifying information;
determining connection usage allocation based on the amount of the payment;
binding the no user identifying passcode with the usage allocation;
establishing the network connection between the user provided client computer and the network service provider for the usage allocated to the no user identifying passcode, based on the connection usage allocation, the no user identifying passcode, and the identifying information of the user provided client computer, without advance sign-up by the user with the network service provider.

24. The medium of claim 23, further comprising preventing other unauthorized computers from accessing the network service provider through the computer system, according to a filtering of bound no user identifying passcodes and identifying information of client computers.

25. The medium as in claim 23, wherein the network connection is a wireless connection, said operations further comprising:
    determining availability of the wireless connection based upon if there is any remaining connection time for the network connection usage allocation for said wireless connection which becomes available for the user provided client computer by amount of money the user deposits at the computer system and a rate for network connection set by the network service provider.

26. The medium as in claim 23, the operations further comprising:
    determining availability of the wireless connection based upon data allocation which is amount of data bytes that the user sends and receives via the computer system, which is based on the amount of money the user deposits into the computer system and a rate for data allocation set by the network service provider.

27. The medium as in claim 23, the operations further terminating by the computer system the network connection upon exhaustion of the network connection usage allocation.

28. The medium as in claim 27, wherein the termination of the network connection comprises deleting by the computer system the no user identifying passcode and its associate network connection usage allocation from the computer system.

29. The medium as in claim 23, the operations further comprising extending by the computer system the network connection usage allocation by additional payment by the user.

30. The medium as in claim 23, the operations further permitting the user to pause a reduction of the network connection usage allocation during the network connection.

31. The medium as in claim 24, wherein the receiving of the payment comprises receiving by the computer system the payment by at least one of cash, phone card, or credit card.

32. A pay-per-connection computer establishing a network connection from a client computer provided by a user as a user provided client computer to a network service provider on a pay-per-connection basis, comprising:
    a payment terminal; and
    a control unit
        maintaining anonymity of the user by receiving, at the payment terminal, from the user of the user provided client computer a passcode not identifying user information as a no user identifying passcode and a payment, and from the user provided client computer identifying information;
        determining network connection usage allocation based on amount of the payment;
        binding the no user identifying passcode with the network connection allocation usage and
        establishing the network connection between the user provided client computer and the network service provider based on the network connection usage allocation, the no user identifying passcode, and the identifying information of the user provided client computer, without advance sign-up by the user with the network service provider.

33. The method of claim 14, further comprising requesting by the user a refund of a remaining portion of the payment corresponding to an unused portion of the network connection usage allocation.

* * * * *

UNITED STATES PATENT AND TRADEMARK OFFICE
CERTIFICATE OF CORRECTION

PATENT NO. : 7,711,097 B2
APPLICATION NO. : 10/875207
DATED : May 4, 2010
INVENTOR(S) : Lusheng Ji et al.

It is certified that error appears in the above-identified patent and that said Letters Patent is hereby corrected as shown below:

Column 13, Line 23, change "connect" to --connection--.

Signed and Sealed this

Seventeenth Day of August, 2010

David J. Kappos
*Director of the United States Patent and Trademark Office*